United States Patent

[11] 3,575,340

[72] Inventor Franklin R. Klebold
Box 266, Colvis, N. Mex. 88101
[21] Appl. No. 777,228
[22] Filed Nov. 20, 1968
[45] Patented Apr. 20, 1971

[54] ANIMAL PROD
6 Claims, 3 Drawing Figs.
[52] U.S. Cl............................................. 231/2, 273/84
[51] Int. Cl....................................... B68b 11/00
[50] Field of Search........................................ 231/2; 273/84

[56] References Cited
UNITED STATES PATENTS
1,193,168 8/1916 Martin............................ 231/2
2,733,003 1/1956 Abildgaard et al. .......... 231/2
2,981,465 4/1961 Bartel............................ 231/2
FOREIGN PATENTS
538,039 11/1931 Germany...................... 231/2

Primary Examiner—Hugh R. Chamblee
Attorneys—William D. Hall, Elliott I. Pollock, Fred C. Philpitt, George Vande Sande, Charles F. Steininger and Robert R. Priddy ABSTRACT: An animal prod, including a cane-shaped extruded, thermoplastic body element having channels formed longitudinally therethrough, a pair of thermoplastic clamp elements having their central portion formed about the cane and clamped thereto adjacent the hook end of the cane, and extending outwardly and terminating in perpendicular end sections overlapping one another, a generally rectangular container of thermoplastic material made up of two half sections passing over the cane and over the clamping elements and forming thereby a compartment on one side of the cane for a battery and a compartment on the opposite side of the cane for an induction coil, a switch mounted atop the container adjacent the hook end of the cane, electrical line means connecting the primary of the induction coil through the battery and the switch, electrical line means leading from the secondary of the induction coil downwardly through the channels formed in the cane element to the end opposite the hook portion and rigid probe elements extending from the end of the cane and connected to the second-mentioned electric line means to form a spark gap.

Patented April 20, 1971 3,575,340

INVENTOR
FRANKLIN R. KLEBOLD

BY *Charles F. Steininger*
ATTORNEY

ANIMAL PROD

BACKGROUND OF THE INVENTION

The present invention relates to an animal prod; more particularly, to an animal prod for loading cattle and other animals into a truck or the like.

Heretofore, a large number of electrical animal prods have been designed. These devices comprise mainly a battery of some type, an induction coil, and a single or a pair of contact elements which are brought into contact with the animal. However, all of these devices have had one or several major drawbacks which prevent their use to any great extent.

The two primary drawbacks of the prior art devices have been that they have been inconvenient to handle because of their bulk and manner of construction and their delicacy due to the materials used and the manner of assembly. In many cases, the battery and coil are placed in a box which is carried by a strap passing across the user's shoulder and the wires to the spark gap elements then pass to a hand-held probe. While this provides a hand-held probe which is light, of small diameter, and therefore convenient to handle, it is almost impossible to use such a device under conditions where cattle or the like are being loaded into a truck or unloaded from a truck. In the other general form of animal prod, the batteries, coil, electrical wiring, etc. are all placed in an elongated pole or prod. In order to accomplish this, the pole or prod must be of substantial diameter and in all instances, the diameter is the same along the entire length of the pole. Further, in order to maintain the diameter within reasonable limits, the use of flashlight batteries has been resorted to and the elements are all placed end to end in the interior of the pole. This still provides a unit which is of too large a diameter to be conveniently handled and, in addition, an unbalanced unit which is difficult to handle in actual use. In addition to the above disadvantages, all the prior art devices have been constructed of metal poles which are readily damaged when treated roughly, or when they are subjected to day-to-day use when used for cattle loading or the like. In addition to the easily damaged metal construction, the wiring and mounting of the elements has been such that rough handling or extensive use can also readily cause short circuits and broken connections.

It is therefore an object of the present invention to provide an improved animal prod. A further object of the present invention is to provide an improved animal prod of a rugged construction. Another and further object of the present invention is to provide an animal prod which is self-contained and yet well balanced. A further object of the present invention is to provide an animal prod where the problem of short circuiting, broken connections and the like is substantially eliminated. Yet another object of the present invention is to provide an animal prod which is economical to manufacture. These and other objects and advantages of the present invention will be apparent from the following description.

SUMMARY OF THE INVENTION

Briefly, in accordance with the present invention, an animal prod is provided comprising an extruded thermoplastic, elongated body element, having two channels formed longitudinally therethrough, a thermoplastic closeable container mounted about the body element adjacent one end thereof, a battery mounted within the container on one side of the body element, a vibrator mounted on the opposite side of the body element in the container, a switch element mounted on the container, and electrical line means connecting said switch, said coil and said battery and having two leads passing through at least a portion of the channels formed in the body element to the end opposite the end on which the container is mounted, and forming an exposed spark gap at said opposite end of the body element.

DETAILED DESCRIPTION OF THE INVENTION

Figure 1:
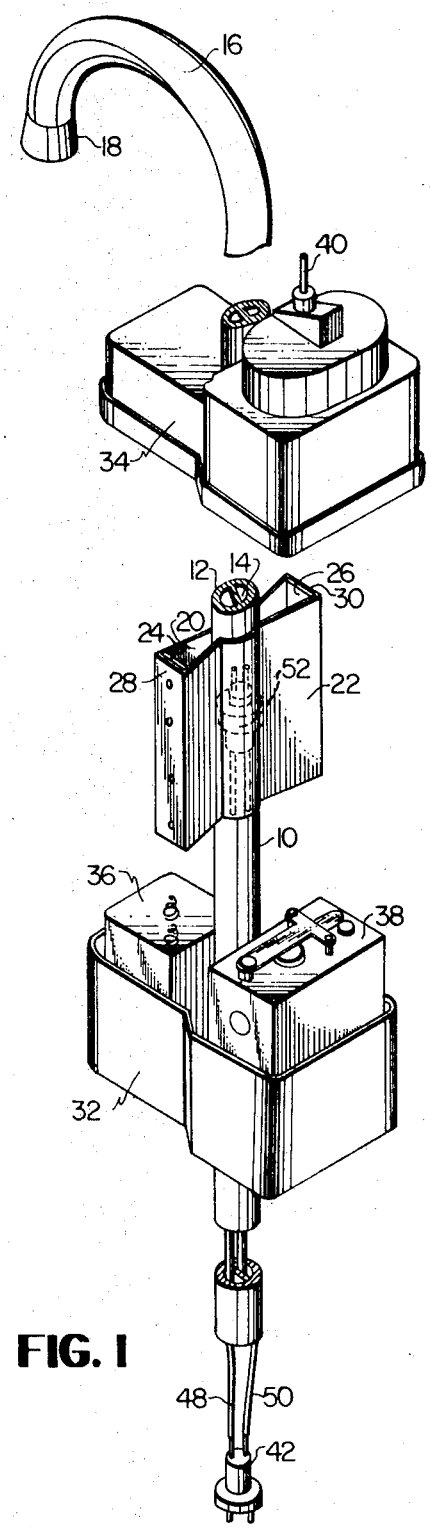
FIG. 1 of the drawings is an exploded view, partially in section, of the animal prod of the present invention.

Referring now to the drawings, the body member of the present invention is designated generally as 10. Body member 10 is an extruded thermoplastic body member having two channels 12 and 14 formed longitudinally therethrough. In addition to providing a rugged construction, the use of a thermoplastic material also makes it highly convenient to form hook end 16 to thereby form a cane-shaped body member. Mounted on the end of the hook 16 is a closing cap 18. Mounted about the body member 10, adjacent hook end 16, are mounting clamps of thermoplastic material 20 and 22, respectively. Mounting clamps 20 and 22 conform to the shape of the body member 10 and are attached to the body member by gluing or other appropriate means. Clamp members 20 and 22 then extend outwardly and terminate in generally perpendicular sides 24, 26, 28, and 30, respectively. Sides 24 and 28 and 26 and 30, respectively, overlap one another, thereby making it convenient to mount the clamp itself as well as the hereinafter referred to container. A container is formed about the body member 10 and the clamp members 20 and 22. This container is made up of a bottom section 32 and a top section 34. When sections 32 and 34 are assembled about clamps 20 and 22, the entire unit may then be very conveniently assembled by self-capping screws passed through the container 32—34 and the clamps 20 and 22. The container 32—34 is formed so that when it is assembled about the clamps 22, a compartment is formed on either side of the body member 10. Mounted in one of these compartments is a battery 36 and mounted in the other compartment is an induction coil 38. Mounted atop top section 34 of the container is a normally open, spring-loaded toggle switch 40. The mounting of the container 32—34 adjacent hook end 16 of the body member 10 and the construction of the container 32—34, so as to accommodate a battery on one side and an induction coil on the opposite side provides a well-balanced and easily handled prod device. In addition, the placement of toggle switch 40 atop the container also adjacent hook portion 16 of the body member 10 provides an additional convenience. Mounted in a reamed out section of the opposite end of the body member 10 is a plug member 42. Plug member 42 has rigidly mounted therein contact elements 44 and 46. Contact elements 44 and 46 form a spark gap as will be described hereinafter. From contact elements 44 and 46, electrical lines 48 and 50 pass upwardly through the channels 12 and 14 formed in body member 10 to appropriate connections to the switch, the battery and the induction coil. While electrical lines 48 and 50 may be passed out the sides of body element 10 in the vicinity of the clamps 20 and 22, another convenient mode of connection is to have a double-ended plug element 52 mounted in the body member 10 in a manner similar to the mounting of plug element 42.

Figure 2:
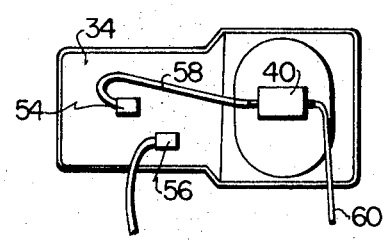
FIG. 2 is an interior view of the top of the container utilized in the prod of FIG. 1.

Yet another convenience of the thermoplastic construction utilized in the present invention is illustrated in FIG. 2. FIG. 2 shows the inside of top 34 of the container 32—34. By utilizing the thermoplastic construction, electrical contact tabs 54 and 56 can be rigidly mounted in the cover 34 simply by heating the thermoplastic cover and forcing these elements into the softened material. Once the thermoplastic material is again hardened, a very rigid and rugged construction results. Contact elements 54 and 56 serve as contacts for the battery 36.

Figure 3:
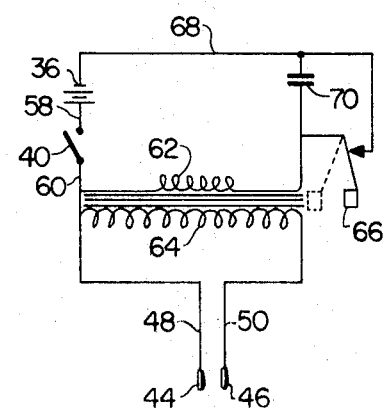
FIG. 3 is an electrical diagram of the prod of FIG. 1.

Referring now to FIG. 3, FIG. 3 shows a separate schematic diagram of the electrical system of the prod of the present invention. In accordance with FIG. 3, battery 36 is provided. Line 58 leads from one side of the battery to the switch 40.

Line 60 leads from the opposite side of the switch to the primary 62 of the induction coil. Lines 48 and 50 lead from contact elements 44 and 46 to the secondary 64 of the induction coil. The opposite side of the battery is connected to the flapper element 66 of the induction coil through line 68. Shunted across the flapper element 66 is a condenser 70. This circuit and its appropriate connections are, of course, well known to one skilled in the art.

I claim:

1. An electrical animal prod comprising: an elongated, extruded, thermoplastic body member having a pair of channels formed longitudinally therethrough, and having one end thereof formed as a hook to thereby provide a cane-shaped body member, a thermoplastic container mounted about said body member and mounted thereon adjacent the hook end of said body member, a pair of contact elements mounted in said body member adjacent the end opposite said hook end and which form a spark gap, a battery means and an induction coil means mounted in said container on opposite sides thereof, the heavier of said battery and said coil being on the same side of said body member as said hook, a switch means mounted on said container exteriorly thereof and adjacent said hook end of said body member, and electrical line means operatively connecting said battery, said switch, said induction coil means, and said contact elements, including two lines connected to said contact elements and passing through separate ones of said channels formed in said body member to a point adjacent said container.

2. A prod in accordance with claim 1 wherein the switch is a normally open spring-loaded switch.

3. A prod in accordance with claim 1 wherein the switch is mounted on the top of the container adjacent the body member.

4. A prod in accordance with claim 1 wherein the container is formed of separate top and bottom sections.

5. A prod in accordance with claim 1 wherein clamp means are mounted about the body member and the container is mounted on the body member through the clamp means.

6. A prod in accordance with claim 5 wherein the clamp means includes two clamps of thermoplastic material conforming to the shape of the body member at their centers and then extending outwardly to form generally perpendicular sides which overlap one another and to which the container is mounted.